US008983848B2

(12) United States Patent
Lavoie et al.

(10) Patent No.: US 8,983,848 B2
(45) Date of Patent: *Mar. 17, 2015

(54) SYSTEMS AND TECHNIQUES FOR PRODUCING SPOKEN VOICE PROMPTS

(71) Applicant: Eliza Corporation, Beverly, MA (US)

(72) Inventors: Lisa Lavoie, Cambridge, MA (US); Lucas Merrow, North Andover, MA (US); Alexandra Drane, Winchester, MA (US); Frank Rizzo, Bedford, MA (US); Ivy Krull, Andover, MA (US)

(73) Assignee: Eliza Corporation, Beverly, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/222,172

(22) Filed: Mar. 21, 2014

(65) Prior Publication Data

US 2014/0207464 A1    Jul. 24, 2014

Related U.S. Application Data

(63) Continuation of application No. 13/742,778, filed on Jan. 16, 2013, now Pat. No. 8,725,516, which is a continuation of application No. 12/020,217, filed on Jan. 25, 2008, now Pat. No. 8,380,519.

(60) Provisional application No. 60/897,315, filed on Jan. 25, 2007.

(51) Int. Cl.
*G10L 21/00* (2013.01)
*G10L 25/00* (2013.01)
(Continued)

(52) U.S. Cl.
CPC ............... *G10L 17/22* (2013.01); *G10L 13/033* (2013.01); *H04M 3/4936* (2013.01); *G10L 15/22* (2013.01); *G10L 13/04* (2013.01); *H04M 2201/39* (2013.01)
USPC .......................................... 704/275

(58) Field of Classification Search
USPC .......................................... 704/275
See application file for complete search history.

(56) References Cited

U.S. PATENT DOCUMENTS 5,367,609 A    11/1994  Hopper et al.
5,890,117 A *  3/1999   Silverman ................... 704/260
(Continued)

FOREIGN PATENT DOCUMENTS

JP    4-248598    9/1992
JP    11-175081   7/1999
(Continued)

OTHER PUBLICATIONS

Supplementary European Search Report dated May 20, 2011 from Corresponding European Application No. 08714021.6.
(Continued)

*Primary Examiner* — Eric Yen
(74) *Attorney, Agent, or Firm* — McDermott Will & Emery LLP

(57) ABSTRACT

Methods and systems are described in which spoken voice prompts can be produced in a manner such that they will most likely have the desired effect, for example to indicate empathy, or produce a desired follow-up action from a call recipient. The prompts can be produced with specific optimized speech parameters, including duration, gender of speaker, and pitch, so as to encourage participation and promote comprehension among a wide range of patients or listeners. Upon hearing such voice prompts, patients/listeners can know immediately when they are being asked questions that they are expected to answer, and when they are being given information, as well as the information that considered sensitive.

19 Claims, 4 Drawing Sheets

(51) Int. Cl.
*G10L 17/22* (2013.01)
*G10L 13/033* (2013.01)
*H04M 3/493* (2006.01)
*G10L 15/22* (2006.01)
*G10L 13/04* (2013.01)

(56) References Cited

U.S. PATENT DOCUMENTS

| | | | |
|---|---|---|---|
| 6,226,614 | B1 | 5/2001 | Milzuno et al. |
| 6,334,106 | B1 | 12/2001 | Milzuno et al. |
| 6,598,020 | B1 | 7/2003 | Kleindienst et al. |
| 6,658,388 | B1 | 12/2003 | Kleindienst et al. |
| 6,990,179 | B2 | 1/2006 | Merrow |
| 7,058,577 | B2 | 6/2006 | Surace et al. |
| 7,177,814 | B2 * | 2/2007 | Gong et al. ............... 704/270.1 |
| 7,222,074 | B2 | 5/2007 | Zhou |
| 7,379,871 | B2 | 5/2008 | Shimakawa et al. |
| 7,412,390 | B2 | 8/2008 | Kobayashi et al. |
| 7,505,892 | B2 | 3/2009 | Foderaro |
| 2002/0069061 | A1 | 6/2002 | Syrdal |
| 2004/0006474 | A1 * | 1/2004 | Gong et al. ............... 704/270.1 |
| 2004/0193421 | A1 | 9/2004 | Blass |
| 2005/0096909 | A1 | 5/2005 | Bakis |
| 2006/0122840 | A1 | 6/2006 | Anderson |

FOREIGN PATENT DOCUMENTS

| | | |
|---|---|---|
| JP | 2004-23709 | 8/2004 |
| JP | 2006-311420 | 11/2006 |
| WO | 2005/067595 | 7/2005 |

OTHER PUBLICATIONS

Beckman et al., Guidlines for ToBI Labelling, The Ohio State University Research Foundation, Ver. 3, Mar. 1997.

Ayers et al., Modelling Dialogue Intonation, International Congress of Phonetic Sciences 1995. Stockholm, Aug. 1995.

International Search Report for Corresponding PCT Application No. PCT/US2008/52060.

Written Opinion for Corresponding PCT Application No. PCT/US2008/52060.

* cited by examiner

SYSTEMS AND TECHNIQUES FOR PRODUCING SPOKEN VOICE PROMPTS

RELATED APPLICATION

This application is a Continuation Application of U.S. patent application Ser. No. 13/742,778 filed Jan. 16, 2013, which is a Continuation Application of U.S. patent application Ser. No. 12/020,217 filed Jan. 25, 2008, which claims the benefit of U.S. Provisional Patent Application No. 60/897,315 filed 25 Jan. 2007, the entire content of which applications is incorporated herein by reference.

FIELD OF THE DISCLOSURE

The present disclosure relates generally to systems for and methods of producing spoken voice prompts for a telephony-based informational interaction. More particularly, the present disclosure relates to systems for and methods of producing spoken voice prompts by controlling speech parameters, including duration of pauses and syllables, as well as pitch (e.g., fundamental frequency) of syllables, words, and phrases.

BACKGROUND OF THE DISCLOSURE

In the new, connected economy, it has become increasingly important for companies or service providers to become more in tune with their clients and customers. Such contact can be facilitated with automated telephonic transaction systems, in which interactively-selected prompts are played in the context of a telephone transaction, and the replies of a human user are recognized by an automatic speech recognition system. The answers given by the respondent are processed by the system in order to convert the spoken words to meaning, which can then be utilized interactively, or stored in a database. One example of such a system is described in U.S. Pat. No. 6,990,179, issued in the names of Lucas Merrow et al. on Jan. 24, 2006, and assigned to the present assignee, further discussed below.

In order for a computer system to recognize the words that are spoken and convert these words to text, the system must be programmed to phonetically break down the spoken words and convert portions of the words to their textural equivalents. Such a conversion requires an understanding of the components of speech and the formation of the spoken word. The production of speech generates a complex series of rapidly changing acoustic pressure waveforms. These waveforms comprise the basic building blocks of speech, known as phonemes. Vowels and consonants are phonemes and have many different characteristics, depending on which components of human speech are used. The position of a phoneme in a word has a significant effect on the ultimate sound generated. A spoken word can have several meanings, depending on how it is said. Linguists have identified allophones as acoustic variants of phonemes and use them to more explicitly describe how a particular word is formed.

To successfully interact on the telephone with people of all ages and from all geographic regions, it is essential to be as clear as possible when directing spoken voice prompts to such people. The people receiving an automated call should preferably know immediately when they are being asked questions that require an answer and when they are being presented important new information. It is sometimes desirable that the speaker follow up with certain information, in which case the information presented should be salient to them in order to maximize the chances of a desired follow up action.

Prior art has dealt with adjusting a voice user interface based on a user's previous interactions with the system. Other prior art has proposed digital enhancements or adjustments to speech to make it more comprehensible to the hearing impaired. However, little or no attention has been paid with regard to controlling the parameters of the spoken prompts in an optimal way so as to achieve the naturalness of speech in connection with the prompts.

A prior art system for transcribing the intonation patterns and other aspects of the prosody of English utterances is the ToBI system (standing for "Tones" and "Break Indices"), as described by Mary E. Beckman and Gayle Ayers Elam of the Ohio State University in 1993. See Guidelines for ToBI Labelling, The Ohio State University Research Foundation, Mary E. Beckman & Gayle Ayers Elam, Ohio State University (ver. 3, Mar. 1997).

The ToBI system was devised by a group of speech scientists from various different disciplines (electrical engineering, psychology, linguistics, etc.) who wanted a common standard for transcribing an agreed-upon set of prosodic elements, in order to be able to share prosodically transcribed databases across research sites in the pursuit of diverse research purposes and varied technological goals. See, also, Ayers et al., Modelling Dialogue Intonation, International Congress of Phonetic Sciences 1995, Stockholm, August 1995.

While prior art systems and techniques may be sufficient for their respective intended purposes, there exists a need for phone-based automated interactive informational systems and techniques that encourage participation and promote comprehension among a wide range of patients or listeners. Additionally, it is desirable to have systems and techniques that provide more natural and effective speech prompts for telephony-based interaction.

SUMMARY OF THE DISCLOSURE

The present disclosure provides systems for and methods of producing the voice prompts useful for automated interactive telephone calls. Such voice prompts can be used in phone-based automated interactive informational techniques to encourage participation and promote comprehension among a wide range of patients or listeners. Additionally, use of such voice prompts can provide more natural and effective speech prompts for telephony-based interaction.

Exemplary embodiments of the disclosure include methods in which spoken voice prompts are produced in a manner such that they will most likely have the desired effect, including indicating empathy towards a patient or listener.

An embodiment includes a system configured to produce and a method of producing spoken voice prompts for telephony-based informational interaction. The method is configured to optimize parameters of spoken prompts and produce optimized parameters; record spoken prompts based on the optimized parameters; and convey the spoken prompts to a listener over a telephone system.

BRIEF DESCRIPTION OF THE DRAWINGS

Aspects of the disclosure may be more fully understood from the following description when read together with the accompanying drawings, which are to be regarded as illustrative in nature, and not as limiting. The drawings are not necessarily to a particular scale, with emphasis instead being placed on the principles of the disclosure. In the drawings.

Figure 1:
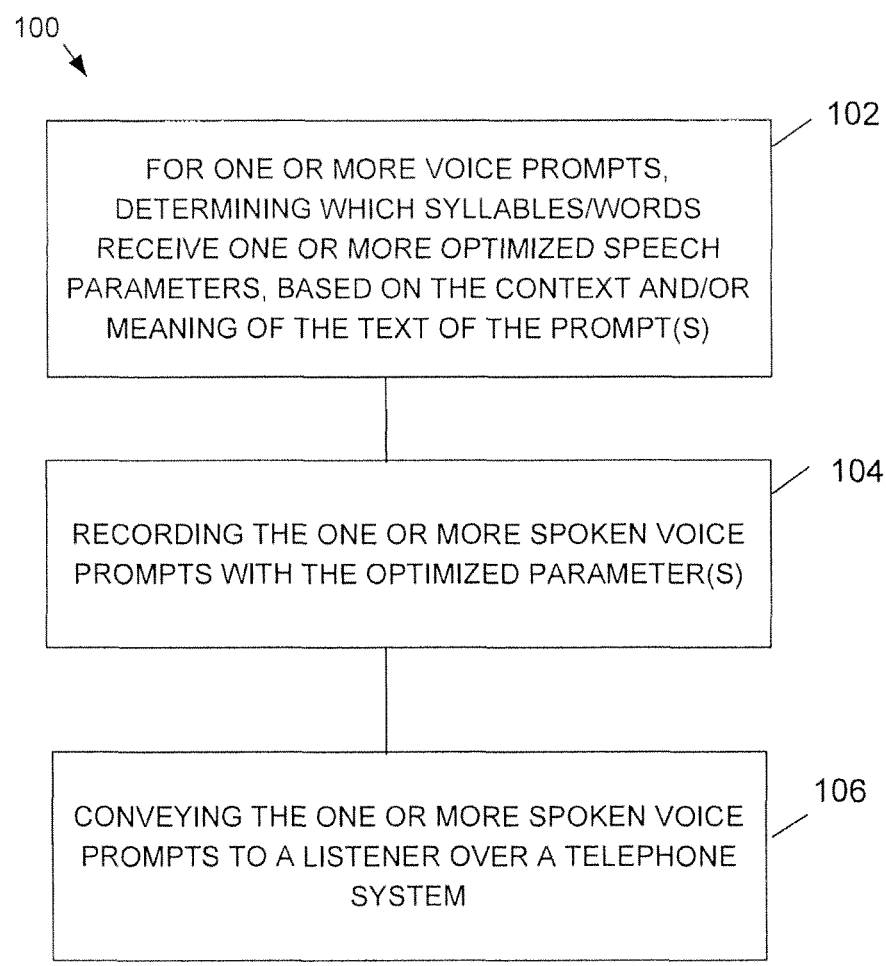
FIG. 1 depicts a flow chart according to an exemplary embodiment of the present disclosure.

It is to be understood that both the foregoing summary of the invention and the following detailed description are exemplary and explanatory and are intended to provide further explanation of the invention as claimed.

DETAILED DESCRIPTION

Using automated telephone based informational systems to interact successfully with a very broad range of call recipients, it is desirable to communicate as precisely and naturally as possible as often times if a call is perceived as burdensome or a waste of time, the call recipient will simply fail to impart the desired information. Aspects and embodiments of the present disclosure provide systems for and techniques of producing spoken voice prompts with optimized or specifically constructed speech parameters such that they will most likely have a desired effect on call recipients during automated telephone based information calls.

By optimizing various speech parameters and providing spoken voice prompts with a natural sound, and not necessarily being grammatically "correct" or having "perfect" enunciation, spoken voice prompts according to the present disclosure can be used to communicate with increased effectiveness during automated telephone based information calls.

For example, words within the sentence of a spoken voice prompt worthy of (or desired to have) attention (or focus) can be produced with a local pitch maximum or minimum. As was described previously, the widely-recognized ToBI system of intonation labeling describes pitch maxima and minima, which are referred to as "pitch accents." The ToBI system describes and categorizes tones and break indices but does not describe how to implement tone and break indices in particular ways. Systems and methods according to the present disclosure can utilize specifically tailored or optimized pitch accents for spoken voice prompts. For example, questions can be produced with rising intonation at the end; statements can be produced with either steady or falling intonation, as is described supra.

In embodiments of the present disclosure, spoken voice prompts can be produced with specific (optimized) duration and pitch parameters that encourage participation and promote comprehension among a wide range of patients. Upon hearing such voice prompts, listeners can know immediately when they are being asked questions that they are expected to answer, and when they are being given information, as well as the information that might be considered sensitive. Other spoken voice parameters can be tailored as well, for example, loudness, speed or tempo, gender of speaker, clarity (e.g., having a gravelly quality), and the like.

According to aspects of the present disclosure, the words and numbers of words that receive pitch accents, and/or other speech parameters that are to be optimized, can be determined based on the context and meaning of the text of the prompts and the desired behavior or behavior change. Such optimized speech parameters can be adjusted or tailored as desired for different populations, such as those speaking a particular language, people in certain geographical regions, or people having other identified demographics, e.g., over a particular age.

Moreover, aspects of the present disclosure can allow pitch accents, and/or other speech parameters to optimized and employed effectively for spoken voice prompts in any of many different languages, not just English. For example, it may be desirable to provide pitch accents to certain syllables in a Spanish spoken voice prompt in a different pattern than the English equivalent spoken voice prompt, based on linguistic customs and/or regional demographic information about local populations.

FIG. 1 depicts an embodiment of a method 100 of producing spoken voice prompts in accordance with the present disclosure. For one or more voice prompts, the particular words and/or syllables (or pauses between such) receiving one or more optimized speech parameters, can be determined based on the context and/or meaning of the text of the one or more prompts, as described at 102. Speech parameters that can be optimized include, but are not limited to, pitch accents, fundamental frequency (base tone), clarity, speed, speaker gender, length of pauses, and the like. For the one or more voice prompts, the number of words receiving one or more optimized speech parameters can also (or alternatively) be determined based on the context and/or meaning of the text of the one or more prompts.

Continuing with the description of method 100, one or more spoken voice prompts can be recorded, as described at 104. The one or more spoken voice prompts can be conveyed to a listener or caller over a telephone system, as described at 108, such as one suitable for telelphony-based informational interaction.

It will be understood that voice prompts according to the present disclosure may be utilized in conjunction with suitable voice recognition techniques. Exemplary voice recognition techniques that can be implemented within the scope of the present disclosure are described in U.S. patent application Ser. No. 11/219,593 filed 2 Sep. 2005, entitled "Speech Recognition Method and System for Determining the Status of an Answered Telephone During the Course of an Outbound Telephone Call," which is a continuation of U.S. patent application Ser. No. 09/945,282 filed 31 Aug. 2001, entitled "Speech Recognition Method and System for Determining the Status of an Answered Telephone During the Course of an Outbound Telephone Call," now U.S. Pat. No. 6,990,179 (referenced above); the entire contents of all of which are incorporated herein by reference. Moreover, voice prompts according to the present disclosure can be built based on previously known information about the targeted person; information obtained in response to such voice prompts described herein may also be used to build a subsequent call to the same person.

Figure 2:
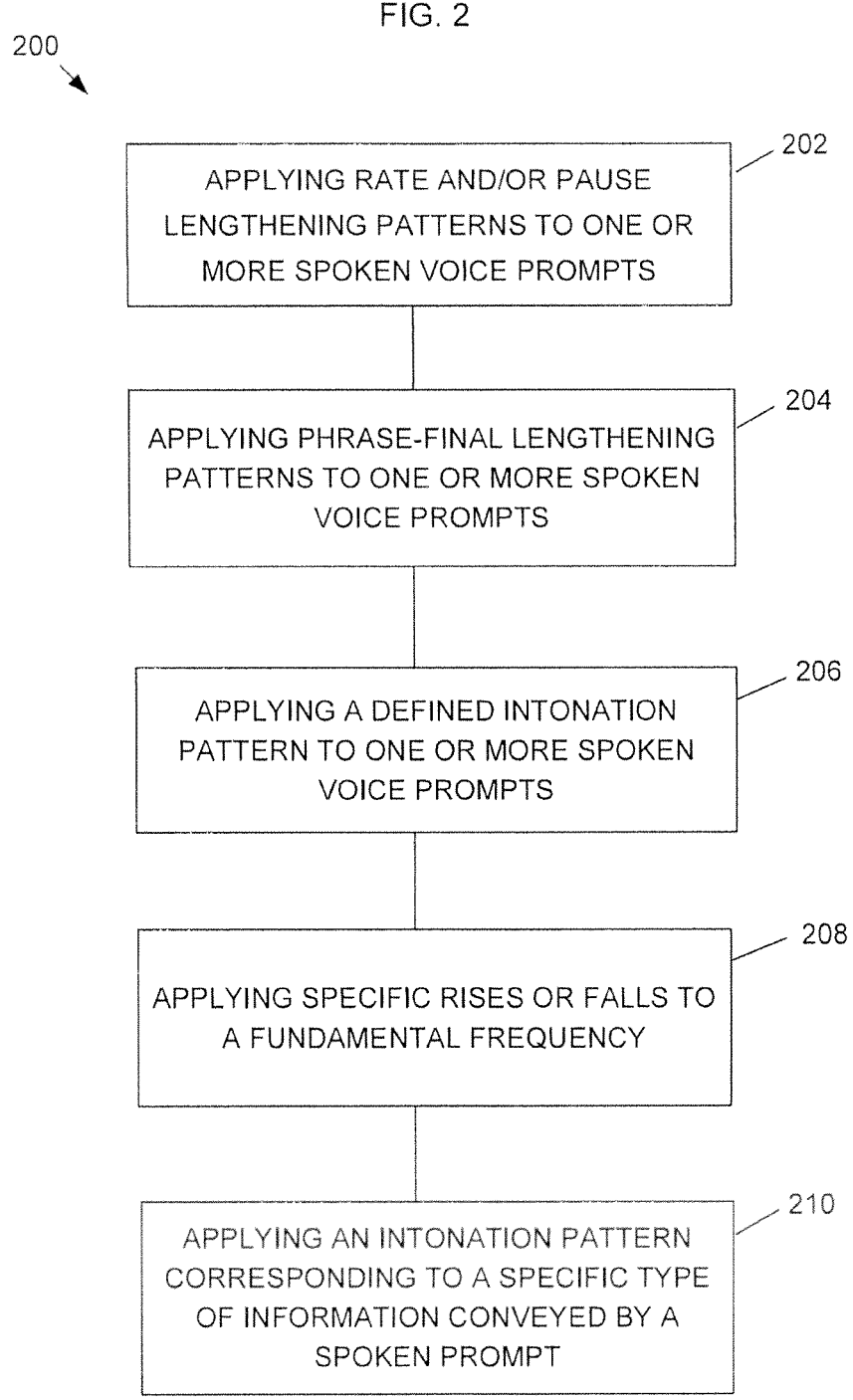
FIG. 2 depicts a flow chart according to exemplary embodiments of the present disclosure.

FIG. 2 depicts an embodiment 200 (or collection) of method portions in accordance with the present disclosure. One skilled in the art should appreciate that the method portions described may be used alone or in any combination for implementation with spoken voice prompts according to the present disclosure. Additionally, although the elements of FIG. 2 are visually presented as successive steps for planning, they can be vocally implemented concurrently (and are implemented as such in exemplary embodiments). For one or more spoken voice prompts, desired speech rate and/or pause lengthening patterns can be applied, as described at 202. For one or more spoken voice prompts, phrase-final lengthening patterns can be applied, as described at 204.

A defined intonation pattern can be applied for one or more spoken voice prompts, as described at 206. Specific rises and/or falls of a fundamental (e.g., base) frequency can be applied to one or more spoken voice prompts, as described at 208. An intonation pattern corresponding to a specific type of information conveyed by (or contained within) a voice prompt can be applied to a spoken voice prompt, as described at 210. The rises and falls in pitch at the end of an utterance are known as phrase and boundary tones. A determination and/or classification of the type or quality of information conveyed by the text of a voice prompt can be made, and one or more speech parameters of the voice prompt can be tailored accordingly. As an example, for a voice prompt deemed to have bad or good information, a male or female voice respectively, could be used when sending the prompt to particular target audiences. Polling and/or survey data can be used in the classification or categorization of the information type of a voice prompt. As a further example, slow speech could be employed to convey complicated or extremely serious information.

For example of 208 and/or 210, high pitch accents, or local pitch maxima, can be used to mark new information as well as the most important information of a particular voice prompt. Pitch extrema (maxima and minima) can be indicated or emphasized by selection of the apparent gender of the speaker of the voice prompts. Low pitch accents, or local pitch minima can be used to mark or indicate known information as well as taboo or potentially disturbing or sensitive information. Words that bear pitch accents can also be longer, e.g., with the syllable bearing primary lexical stress approximately triple its usual length. Lengthening can in addition (or in substitution) be used to convey phrasal and/or sentential punctuation.

As was described previously, questions in voice prompts can be produced with rising intonation at the end and statements are produced with either steady or falling intonation. Words within the sentence of a spoken voice prompt that are deemed worthy of attention (or focus) can be produced with a local pitch maximum or minimum.

Figure 3:
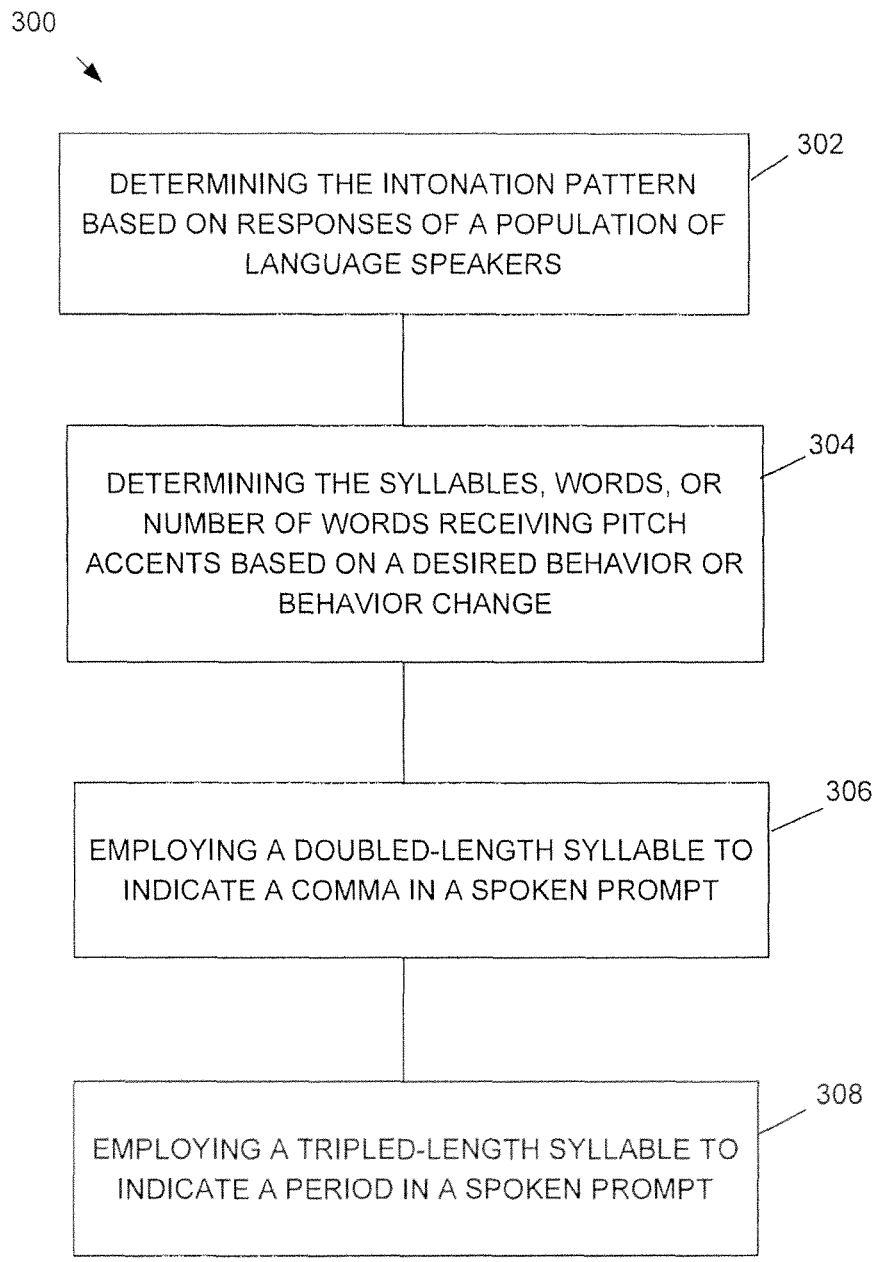
FIG. 3 depicts further method portions in accordance with exemplary embodiments of the present disclosure.

FIG. 3 depict an embodiment 300 (or collection) of method portions in accordance with the present disclosure. One skilled in the art should appreciate that the method portions described may be used alone or in any combination for implementation with spoken voice prompts according to the present disclosure. An intonation pattern for a spoken voice prompt can be determined based on responses of one or more test populations, as described at 302. For an older target population, the speaker can adjust the absolute pitch range downward to compensate for the common age-related hearing loss (presbycusis) that occurs, particularly in the higher frequencies.

Continuing with the description of embodiment 300, a determination can be made as to which syllables, words, and/or number of words of a spoken voice prompt receive pitch accents, based on a desired behavior or behavior change, as described at 304. For implementation of one or more spoken voice prompts, a doubled-length (or approximately doubled-length) syllable can be used to indicate a comma in a spoken prompt, as described at 306. A tripled-length (or approximately tripled-length) syllable can be used to indicate a period (or similar pronunciation break) in a spoken prompt, as described at 308.

In exemplary embodiments, a phrase-final syllable (typically corresponding to a comma in the text), can be approximately doubled in length and a sentence-final syllable (typically corresponding to a period in the text), can be approximately tripled in length. Silent pauses also can be employed to reinforce the phrase or sentence breaks. For an older target population, the speaker can adjust the rate downward to account for possible decreases in rate of central auditory processing and flexibility of working memory in an elderly population.

Figure 4:
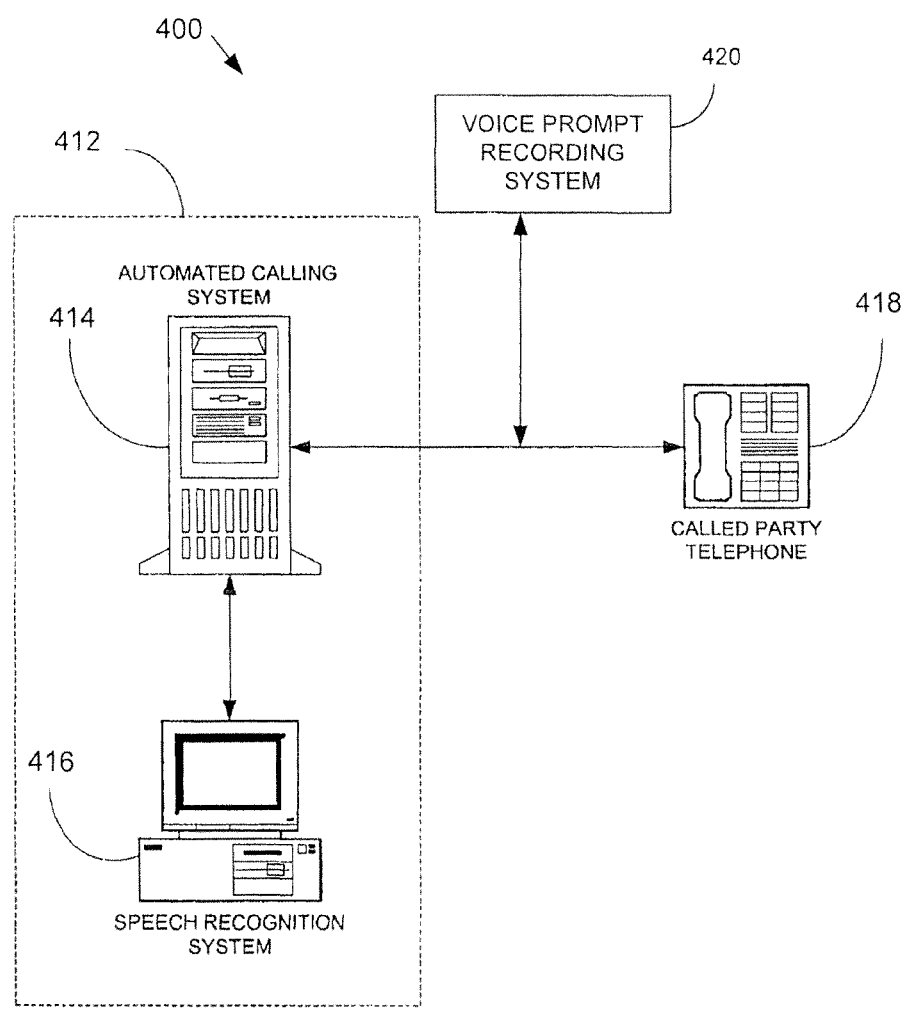
FIG. 4 depicts a diagrammatic view of a system in accordance with an exemplary embodiment of the present disclosure.

FIG. 4 depicts a diagrammatic view of a system 400 in accordance with an exemplary embodiment of the present disclosure. System 400 can include an automated subsystem 412 that includes an automated telephone calling system 414 and a speech recognition system 416. System 400 can include a called party telephone 418, and a voice prompt recording system 420, as shown. Voice prompt recording system 420 can include any suitable voice recording device and/or voice recording media, e.g., magnetic tape, flash memory, etc.

The automated telephone calling system 414 can be of any suitable kind, and may include a personal computer such, although a main frame computer system can also be used. All of the components of telephone calling system 414 can reside on a particular computer system, thus enabling the system to independently process data received from a respondent in the manner described below. Alternatively, the components of system 414 may be included in different systems that have access to each other via a LAN or similar network. For example, the automated telephone calling device 414 may reside on a server system that is configured to receive the audio response from a telephone 418 and transmit the response to the speech recognition device 416.

The automated telephone calling system 414 may also include a network interface that facilitates receipt of audio information by any of a variety of networks, such as telephone networks, cellular telephone networks, the Web, Internet, local area networks (LANs), wide area networks (WANs), private networks, virtual private networks (VPNs), intranets, extranets, wireless networks, and the like, or some combination thereof. The automated subsystem 412 may be accessible by any one or more of a variety of input devices capable of communicating audio information. Such devices may include, but are not limited to, a standard telephone or cellular telephone 418.

With continued reference to FIG. 4, automated telephone calling system 414 can include a database of persons to whom the automated subsystem 412 is capable of initiating telephone calls, a telephone number associated with each person and a recorded data file that includes the target person's name. Such automated telephone calling devices are known in the art. As is described below, the automated telephone calling system 414 is capable of initiating a telephone call to a target person and playing a prerecorded greeting prompt, asking for the target person, and/or other voice prompts such as described previously for FIGS. 1-3. System 414 can then interact with speech recognition system 416 to analyze responses received from the person on telephone 418.

Speech recognition system 416 can function as an automated system on which a speech recognition application, including a series of acoustic outputs or voice prompts, which can comprise queries about a particular topic, are programmed so that they can be presented to a respondent, preferably by means of a telephonic interaction between the querying party and the respondent. A speech recognition application, however, may be any interactive application that collects, provides, and/or shares information, or that is capable of such. As examples, in the present disclosure, a speech application may be any of a group of interactive applications, including consumer survey applications; Web access applications; educational applications, including computer-based learning and lesson applications and testing applications; screening applications; consumer preference monitoring applications; compliance applications, including applications that generate notifications of compliance related activities, including notifications regarding product maintenance; test result applications, including applications that provide at least one of standardized tests results, consumer product test results, and maintenance results; and linking applications, including applications that link two or more of the above applications.

Accordingly, methods/techniques according to the present disclosure can provide spoken voice prompts that are produced in a manner such that they will most likely have the desired effect, such as to indicate empathy to a person receiving voice prompts.

The prompts can be produced with specific speech parameters, e.g., variation of rate, syllable duration and pitch, that encourage participation and promote comprehension among a wide range of listeners, e.g., patients. Upon hearing such voice prompts, listeners can know immediately when they are being asked questions that they are expected to answer, and when they are being given information, as well as the information that considered sensitive. Moreover, aspects of the present disclosure can allow optimized speech parameters, e.g., pitch accents, to be employed effectively for spoken voice prompts in any of many different languages, and not just English.

While certain embodiments have been described herein in the context of in-patient and out-patient settings, it will be understood by one skilled in the art that the techniques, methods, systems, and apparatus of the present disclosure may be embodied in other specific forms without departing from the spirit thereof.

Accordingly, the embodiments described herein, and as claimed in the attached claims, are to be considered in all respects as illustrative of the present disclosure and not restrictive.

What is claimed is:

1. A method of producing spoken voice prompts for telephony-based informational interaction, the method comprising:
   for one or more voice prompts, determining words that receive an optimized speech parameter, based on context and/or meaning of the text of the one or more voice prompts, wherein the optimized speech parameter is selected based on a dialog context of a dialog with a listener;
   recording the one or more voice prompts, producing one or more spoken voice prompts; and
   conveying the one or more spoken voice prompts to a listener over a telephone system.

2. The method of claim 1, further comprising determining the number of words that receive an optimized speech parameter based on context and/or meaning of the one or more voice prompts.

3. The method of claim 1, wherein the optimized speech parameter comprises one or more pitch accents.

4. The method of claim 3, wherein the one or more pitch accents yield a pause lengthening pattern.

5. The method of claim 3, wherein the one or more pitch accents comprise a phrase-final lengthening pattern.

6. The method of claim 3, further comprising one or more boundary tones, wherein the one or more pitch accents and boundary tones comprise a defined intonation pattern.

7. The method of claim 6, wherein the defined intonation pattern comprises specific rises or falls of the fundamental frequency of a spoken prompt.

8. The method of claim 7, wherein the intonation pattern corresponds to a defined type of the information conveyed by the spoken prompts.

9. The method of claim 8, wherein the intonation pattern is determined based on responses to specific types of voice prompts, wherein the responses are from a population of participants in a computer-based exchange.

10. The method of claim 3, wherein the words receiving the one or more pitch accents are determined based on a desired behavior that is desired of a person receiving a telephony call.

11. The method of claim 3, wherein the words receiving the one or more pitch accents are determined based on a desired behavior change that is desired of a person receiving a telephony call.

12. The method of claim 8, further comprising using high pitch accents to indicate new information.

13. The method of claim 8, further comprising using high pitch accents to indicate important information.

14. The method of claim 8, further comprising using low pitch accents to indicate disturbing new information.

15. The method of claim 8, further comprising using low pitch accents to indicate sensitive information.

16. The method of claim 8, wherein the one or more pitch accents comprise a syllable bearing primary lexical stress approximately triple a usual length of the syllable.

17. The method of claim 8, further comprising using syllable lengthening to convey phrasal sentential punctuation.

18. The method of claim 17, wherein, to indicate a comma in the spoken prompt, a phrase final syllable is approximately doubled in length compared to an unaccented same syllable.

19. A system for directing optimized voice prompts to a telephone during the course of an outbound telephone call, the system comprising:
   a recording system configured and arranged to record one or more spoken voice prompts, wherein the one or more spoken voice prompts include one or more optimized speech parameters, wherein the one or more optimized speech parameters are selected based on a dialog context of a dialog with a listener;
   an automated calling system configured and arranged to place an automated outbound telephone call including the one or more spoken voice prompts to a target person at a called party telephone;
   an automated speech recognition system configured and arranged to process auditory responses of the target person as made in response to the one or more voice prompts.

* * * * *